United States Patent
Jiang

(10) Patent No.: US 9,838,132 B2
(45) Date of Patent: *Dec. 5, 2017

(54) OPTICAL TRANSCEIVER DEVICE

(71) Applicant: Jo-Chieh Chiang, Kaohsiung (TW)

(72) Inventor: Sean Jiang, Kaohsiung (TW)

(73) Assignee: Jo-Chieh Chiang, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,901

(22) Filed: Sep. 19, 2016

(65) Prior Publication Data

US 2017/0026130 A1 Jan. 26, 2017

Related U.S. Application Data

(63) Continuation-in-part of application No. 14/187,739, filed on Feb. 24, 2014, now Pat. No. 9,473,243.

(30) Foreign Application Priority Data

Feb. 25, 2013 (TW) .............................. 102106614 U
Sep. 18, 2013 (TW) .............................. 102133827 U

(51) Int. Cl.
*H04B 10/40* (2013.01)
*H04Q 11/00* (2006.01)

(52) U.S. Cl.
CPC ......... *H04B 10/40* (2013.01); *H04Q 11/0005* (2013.01); *H04Q 2011/0007* (2013.01)

(58) Field of Classification Search
None
See application file for complete search history.

(56) References Cited

U.S. PATENT DOCUMENTS

| | | | | |
|---|---|---|---|---|
| 6,647,212 B1 * | 11/2003 | Toriumi | ............... | H04B 10/691 398/120 |
| 7,212,738 B1 * | 5/2007 | Wang | ................... | H04B 10/032 398/17 |
| 2003/0190113 A1 * | 10/2003 | Huang | ................ | G02B 6/3586 385/18 |

* cited by examiner

*Primary Examiner* — Shi K Li
*Assistant Examiner* — Mina Shalaby
(74) *Attorney, Agent, or Firm* — Chun-Ming Shih

(57) ABSTRACT

An optical transceiver device is provided, including an O/E transceiver module, an optical switching module and a switching control module, for providing network communication services for a first and a second optical fiber network equipment. The O/E transceiver module is an integrated chip having multiple transceiver units integrated therein. The switching control module is connected to an in-line equipment and the optical switching module for controlling the optical switching module to execute corresponding optical path switching operation according to an optical path switching control signal output from the inline equipment. In comparison with conventional optical transceiver devices, the invention is advantageous of simple structure, smaller volume and more flexible optical path switching.

16 Claims, 15 Drawing Sheets

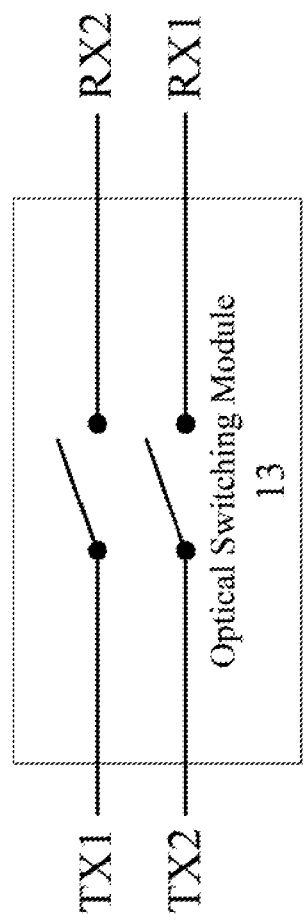

OPTICAL TRANSCEIVER DEVICE

CROSS-REFERENCE TO RELATED APPLICATIONS

This application is a continuation-in-part application of U.S. application Ser. No. 14/187,739.

BACKGROUND OF THE INVENTION

Field of the Invention

The invention relates to an optical transceiver device, particularly to an optical transceiver device with smaller volume and simpler structure.

Descriptions of the Related Art

With the rapid development of network technologies, optical communication technology has become a major communication technology developed currently because of several advantages, including rapid transmission speed, long transmission distance, capability of anti-electromagnetic interference, and high security etc.

Conventional optical transceiver devices are mainly formed by O/E transceivers, optical switching switches and optical transceiving components.

O/E transceivers are mainly in charge of mutual conversion processes between optical signal and electrical signal. Conventional O/E transceivers are provided in optical transceiver devices as parts individually. Because of limited number of optical signal transmitting channels provided by a single O/E transceiver, as optical transceiver devices are connected to multiple optical network equipments, multiple O/E transceivers have to be provided therein, such that O/E transceiving modules are maximized, which results in relatively large volume for conventional optical transceiver devices.

Moreover, optical signal transmits between optical switching switches and optical transceiving components in an optical transceiver devices is achieved by optical cables. Because the transmitting of optical signal in optical cables utilizes refraction and total reflection of optical signal, a certain degree of bending radius (in terms of EAI/TIA 568 regulation, the bending radius of multi-mode optical cable shall not be smaller than 25 mm) is necessary for the optical cable used in transmitting optical signal, such that optical signal keep on transmitting in optical cables without degradation. Therefore, a space has to be reserved inside the optical transceiver device to contain optical cables, such that the volume cannot be reduced and the development trend to minimize optical transceiver device is impossible.

In view of this, it is the technical subject of the invention to reduce the volume of an optical transceiver device.

SUMMARY OF THE INVENTION

In view of various problems of prior arts mentioned above, one object of the invention is to provide an optical transceiver device with smaller volume.

To achieve above object and other objects, an optical transceiver device of the invention is provided to connect a first, second optical network equipments and an in-line equipment, respectively, in order to form an optical fiber network to provide network communication services for the first, second optical network equipments. The optical transceiver device of the invention has an O/E transceiver module, a control module for transceiver, an optical wave guide, an optical switching module and a switching control module. The O/E transceiver module is formed by an integrated chip integrating a plurality of O/E transceiver units. In the integrated chip, multiple full duplex transmitting parallel channels are integrated for receiving optical signal in parallel and converting the received optical signal into electrical signal, and transmitting the converted electrical signal to the in-line equipment; or for receiving electrical signal of the in-line equipment, and converting the received electrical signal into optical signal. The control module for transceiver, which electrically connects said in-line equipment, for receiving an O/E transceiving control signal output from the in-line equipment, thereby each of the O/E transceiver units on the integrated chip in the O/E transceiver module being controlled to perform a corresponding O/E transceiving operation. The optical wave guide is for changing the traveling direction of optical signal. The optical switching module has optical switches for performing a switching operation of optical channels, being optical coupled with the first, second optical network equipments for receiving the optical signal of the first, second optical network equipments, and optically coupling said O/E transceiver module through said optical wave guide in order for optical signal transmitting with said O/E transceiver module. The switching control module electrically connects the in-line equipment and the optical switching module, for receiving the optical switching control signal output from the in-line equipment, thereby the optical switching module being controlled to perform a corresponding optical channel switching operation.

Preferably, the optical transceiver device of the invention further include an optical coupler, which optically couples the first, second optical network equipments, an external monitoring equipment and the optical switching module, in order for said external monitoring equipment to monitor the optical signal transmitting between the first, second optical network equipments and in-line equipment. The in-line equipment further includes control signal output unit, which connects the control module for transceiver and the switching control module through a TWI bus (two wire interface bus) (I2C bus, SM bus, etc.), respectively, for controlling both the control module for transceiver and the switching control module. The in-line equipment may connect said switching control module through a GPIO port for controlling the switching control module.

Preferably, the optical switching module switches optical channels to switch its operation modes, the operation modes including normal mode, bypass mode and bypass disabled mode. The bypass disabled mode can be said failure open mode, link drop mode or block mode.

Preferably, the switching control module may monitor the operation status of the in-line equipment by the optical switching control signal. When the in-line equipment is monitored as in normal operation, the switching control module may send a first control instruction to the optical switching module for the first, second optical network equipment to perform optical signal transmitting to the O/E transceiver module. When the in-line equipment is monitored as in abnormal operation, the switching control module may send a second control instruction to the optical switching module for the optical signal to be transmitted between the first, second optical network equipment mutually without the O/E transceiver module.

Preferably, the switching control module may have a monitoring unit and a process unit. The monitoring unit may receive a return-to-zero signal and perform timing operation. As the return-to-zero signal is received at the timing of a default time, a first state signal is generated. As the return-to-zero signal is not received at the timing of the default time, a second state signal is generated and an operating system on the in-line equipment is rebooted. The process unit receives a state signal generated by the monitoring unit. As the received signal changes from the second state signal to the first state signal, the first control instruction is sent to the optical switching module. As the received signal changes from the first state signal to the second state signal, the second control instruction is sent to the optical switching module. The monitoring unit and said process unit may be integrated as a chipset.

Preferably, the optical switches of the optical switching module further includes an optical input port, an optical output port, an space for optical for providing optical channels for optical signal, an optical element for switching the optical channel, and a driving unit for receiving the optical switching control signal output from said switching control module, thereby the move of said optical element to or from the space for optical path is controlled. The optical input port and optical output port are located on the same side of the optical switching module, and as the driving unit controls the optical element to move to the space for optical path, the optical signal input by the optical input port will be reflected due to the impact of the optical element, the channel for the optical signal to travel will be switched from the optical channel of the optical input port to the optical channel of the optical output port. The optical element may be a total reflection mirror with a V-shaped or W-shaped reflection mirror plane. The optical channel of the optical input port and the optical channel of the optical output port are parallel to each other.

Moreover, the present invention further provide an optical transceiver device having an O/E transceiver module, which is at least formed by an integrated chip integrating a plurality of O/E transceiver units and a wavelength division multiplexer.

Moreover, the present invention further provide an optical transceiver device having a wavelength division multiplexer, which is not belonging one part of O/E transceiver module.

In comparison to prior arts, for the optical transceiver device provided by the invention, the volume of the O/E transceiver module is reduced by integrating the plurality of O/E transceiver units into one integrated chip to form an integrated O/E transceiver module.

Furthermore, the optical switching module provided by the invention may switch optical channels with a mirror total reflection principle for an optical access port to be provided close to one side of the optical transceiver module, so that an optical fiber of the optical access port may be connected to the optical transceiving port without routing. As such, no space is necessary to be reserved for the optical transceiver device with respect to optical fiber routing, such that the entire volume of the optical transceiver device is further reduced.

BRIEF DESCRIPTION OF THE DRAWINGS

The above and other aspects, features and other advantages of the present invention will be more clearly understood from the following detailed description taken in conjunction with the accompanying drawings, in which:

FIGS. 5A to 5C are schematic views showing different switching states of an optical switching module according to the invention.

DETAILED DESCRIPTION OF THE PREFERRED EMBODIMENT

Figure 1:
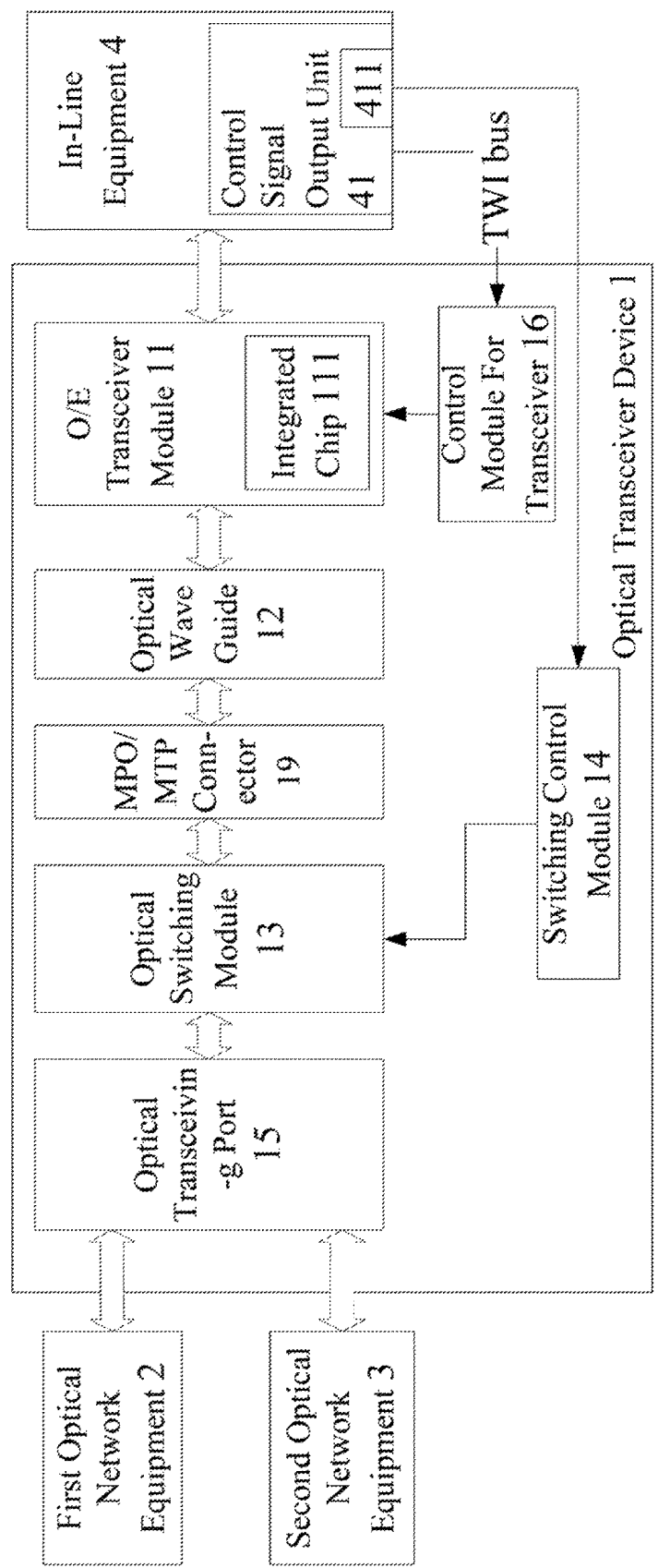
FIG. 1 is a structure diagram showing an optical transceiver device of a first example according the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 13:
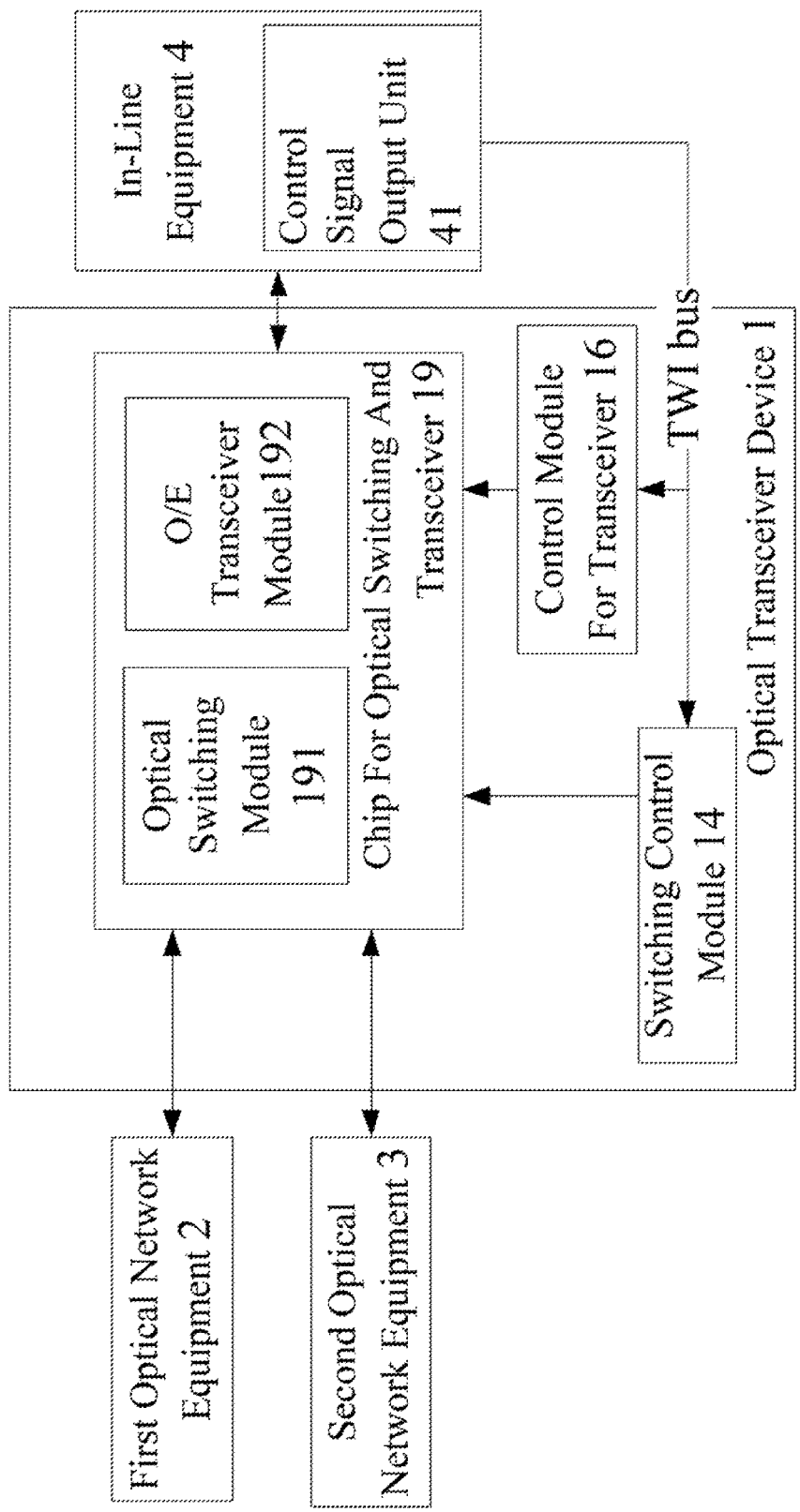
FIG. 13 is an implementation perspective view showing the arrangement of O/E transceiver modules and optical switching modules in an optical transceiver device on a single chip according to the invention.

Refer to FIGS. 1 to 4, which are system structure diagram showing various examples of optical transceiver devices according to the invention, wherein, identical or like elements are indicated by identical or like numerals in various examples without detailed description in order for more clear understanding of the technical description of the application. As shown in FIG. 1, an optical transceiver device 1 of the invention is connected to a first optical network equipment 2, a second optical network equipment 3 and an in-line equipment 4 for forming an optical fiber network to provide service functions, such as network communication, for first optical network equipment 2 and the second optical network equipment 3. The optical transceiver device 1 includes at least an O/E transceiver module 11, an optical wave guide 12, an optical switching module 13, a switching control module 14, an optical transceiving port 15 and a control module for transceiver 16. For process requirement, a MPO/MTP connector 19 (Multi-Fiber Push On/Multi-Fiber Pull Off connector) may be installed between the optical switching module 13 and the optical wave guide 12 for easy cable routing. The O/E transceiver module 11 and the control module for transceiver 16 may be integrated as a single entity or arranged separately. Similarly, the optical switching module 13 and the switching control module 14 may be integrated as a single entity or arranged separately. Also, refer to FIG. 13. As shown in FIG. 13, the optical transceiver device 1 is provided with an chip for optical switching and transceiver 19, which has an O/E transceiver module 191 and an optical switching module 192 to replace the O/E transceiver module 11 and the optical switching module 13 mentioned above. As such, the volume of the optical transceiver device 1 may be reduced further, and the optical fiber routing between the O/E transceiver module 11 and the optical switching module 13 may be simplified. The chip for optical switching and transceiver 19 may be, for example, formed by a planar lightwave circuit (PLC) and micro electro mechanical system (MEMS), but not limited thereto.

Figure 2:
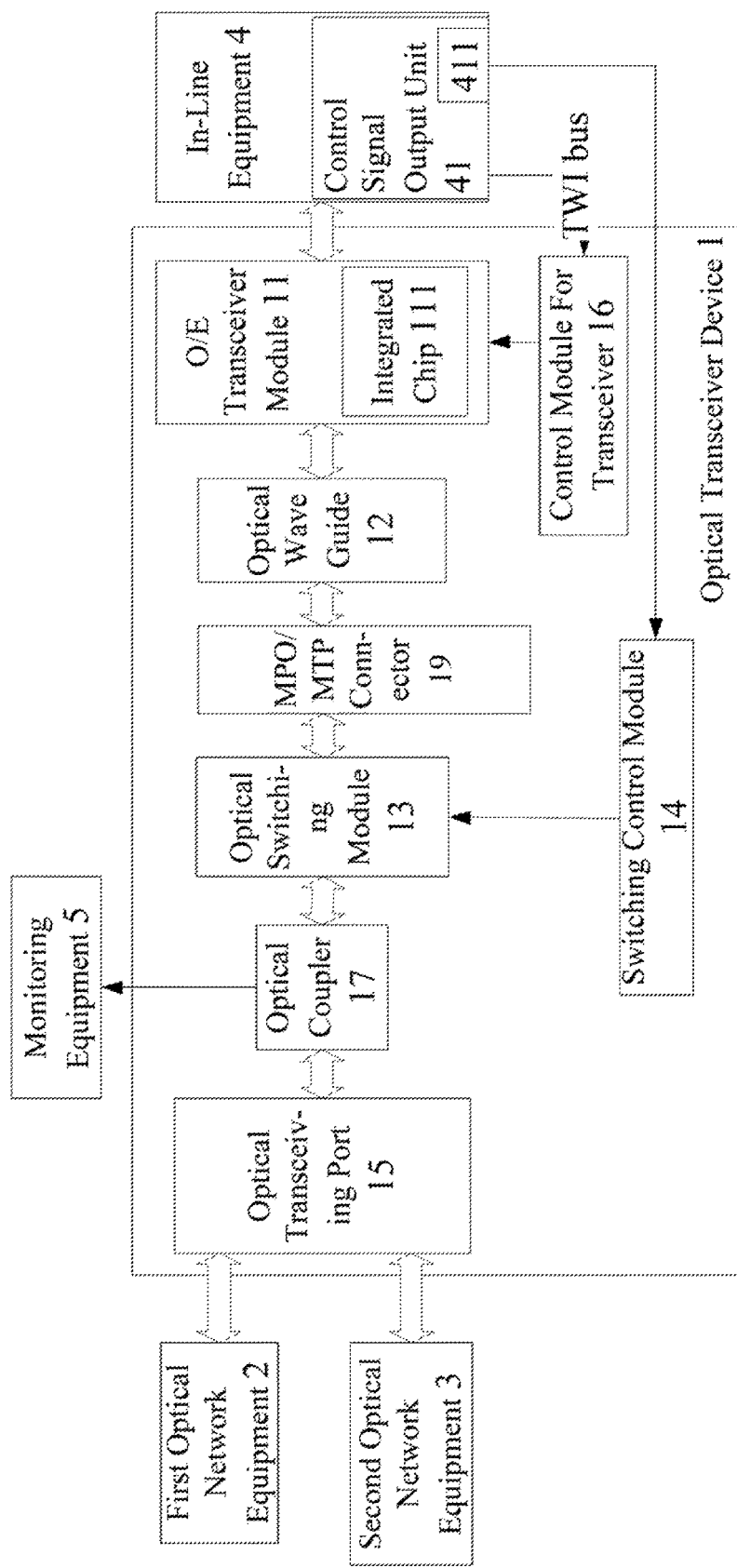
FIG. 2 is a structure diagram showing an optical transceiver device of a second example according the invention.

The optical transceiving port 15 may be connected with the first optical network equipment 2, the second optical network equipment 3 and the optical switching module 13 separately in order for transceiving process of optical signal. For the example as shown in FIG. 2, the optical transceiver device 1 may further include an optical coupler 17, which is optically coupled to the optical transceiving port 15 and the optical switching module 13 in order for coupling process with respect to optical signal transmitting between the optical transceiving port 15 and the optical switching module 13, such that the transmitted optical signal is split in a proportional or non-proportional manner, and is provided for an external monitoring equipment 5 to determine the condition of the optical signal accessed by the optical transceiving port 15, that is, the function of split mode or aggregation mode for optical signal is performed. The optical signal splitting from the optical coupler 17 to external monitoring equipment 5 may be accessed by optical transceiving port 15 and perform the function for said external monitoring equipment to monitor the optical signal transmitting between said first, second optical network equipments and in-line equipment. It is noted that the optical coupling between the optical coupler 17 and the two modules, the optical transceiving port 15 and the optical switching module 13 may be achieved by mutual connection of optical fibers in a fiber splicing or ferrule sleeve manner.

The O/E transceiver module 11 provided by the invention is formed of at least one integrated chip 111 integrated with multiple O/E transceiver units therein. The O/E transceiver module 11 may receive, in parallel, optical signal received from the first optical network equipment 2, the second optical network equipment 3, and convert the received optical signal into electrical signal, followed by optical signal transmitting the converted electrical signal to the in-line equipment 4 for the in-line equipment 4 to receive and process. In addition, the in-line equipment 4 may also provide electrical signal for the O/E transceiver module 11 to receive. The O/E transceiver module 11 may convert the received electrical signal into optical signal for respective transmitting to the first optical network equipment 2, the second optical network equipment 3. In the invention, the integrated chip 111 in the O/E transceiver module 11 may be a quad SPF+ (QSFP+) interface chip with 4 full duplex transmitting parallel channels and 4 sets of O/E transceiver units integrated therein. It is to be noted that the number of the parallel channels and O/E transceiver units of the integrated chip in the O/E transceiver module of the invention is not limited to what mentioned above, but may be increased or decreased in order for improved design according to actual requirement.

The control module for transceiver 16 may be electrically connected to the in-line equipment 4 through a TWI (two wire interface bus) (I2C bus, SM bus, etc.) to receive O/E transceiving control signal output from the in-line equipment 4, thereby each of the O/E transceiver units in the integrated chip 111 is controlled to perform an O/E transceiving process. The O/E transceiving process converts the received optical signal into electrical signal, or converts the received electrical signal into optical signal.

The above optical switching module 13 includes at least an optical switch with bypass function or full function used to perform a switching operation for optical channels, wherein, the optical switching module 13 may be optical coupled with the O/E transceiver module 11 by the optical wave guide 12 to achieve the transmitting of optical signal. The optical wave guide 12 is a device capable of changing the traveling direction of the optical signal. The optical switching module 13 may be optically coupled with the optical wave guide 12 by a MPO connector. The optical switching module 13 switches optical channels to switch its operation modes, including at least normal mode and bypass mode (mentioned later in detail).

The switching control module 14 connects electrically the in-line equipment 4 and the optical switching module 13 to receive optical switching control signal output from a control signal output unit 41 of the in-line equipment 4 through a general purpose I/O (GPIO) pin 411, thereby the optical switching module 13 is controlled to perform corresponding optical switching operations. The switching control module 14 may be a pin exposed to the optical transceiver device 1, a control logic circuit or a microprocessor.

Figure 3:
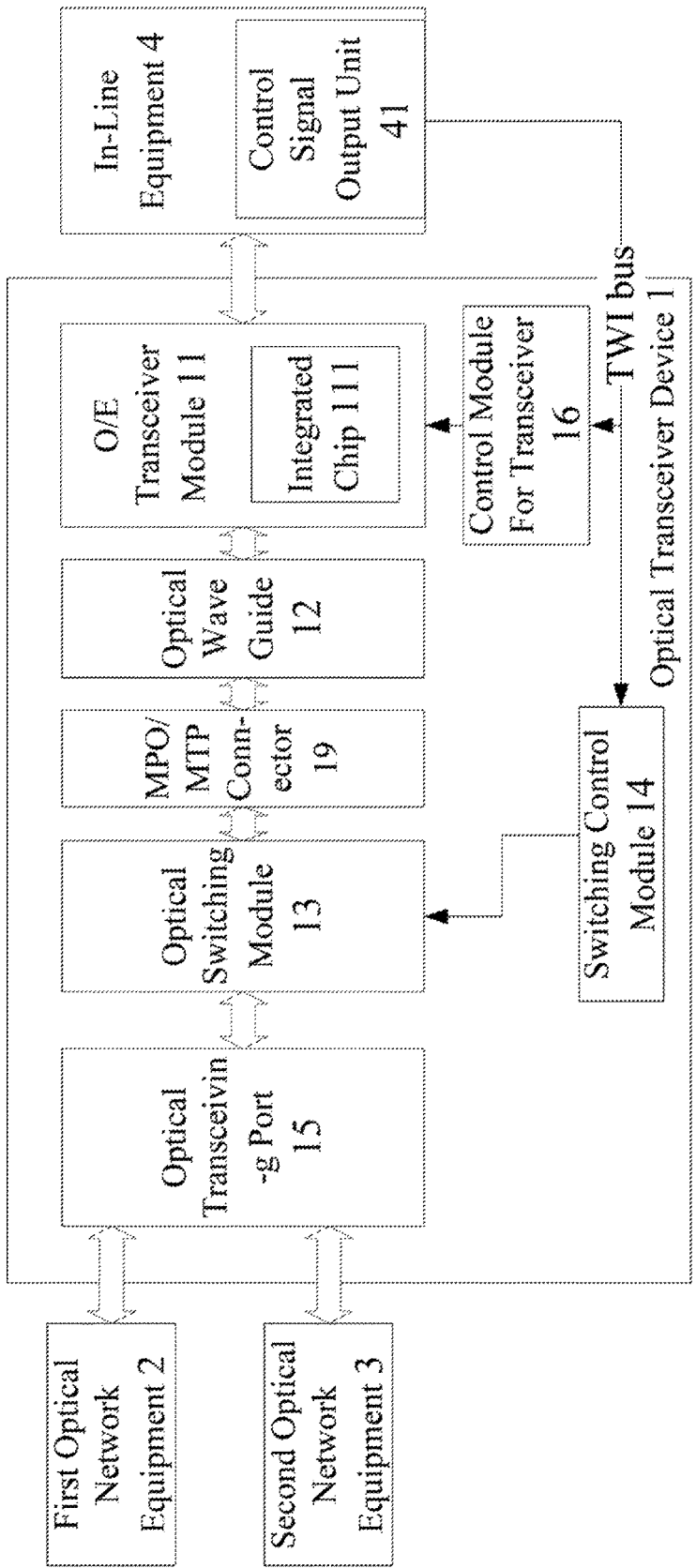
FIG. 3 is a structure diagram showing an optical transceiver device of a third example according the invention.

As shown in the example of FIG. 3, the output for the optical switching control signal of the in-line equipment 4 may be achieved through the TWI bus of the control signal output unit 41. Specifically, the control signal output unit 41 of the in-line equipment 4 may be connected to the switching control module 14 through the TWI bus, such that the optical switching control signal is transmitted to the switching control module 14 by the control signal output unit 41. Similarly, the control signal output unit 41 may also transmit the O/E transceiving control signal to the control module for transceiver 16 by the TWI bus.

In addition, the switching control module 14 may monitor the operation status of the in-line equipment by the optical switching control signal. When the in-line equipment is monitored as in normal operation, the switching control module 14 may send a first control instruction to the optical switching module for the first, second optical network equipment 2, 3 to perform optical signal transmitting to the O/E transceiver module 11. When the in-line equipment is monitored as in abnormal operation, the switching control module 14 may send a second control instruction to the optical switching module for the optical signal to be transmitted between the first, second optical network equipment 2, 3 mutually without the O/E transceiver module 11.

Preferably, the switching control module 14 may have a monitoring unit and a process unit. The monitoring unit may receive a return-to-zero signal, which represents normal operation, output from the in-line equipment, and perform timing operation. As the return-to-zero signal is received at the timing of a default time, a first state signal is generated. As the return-to-zero signal is not received at the timing of the default time, a second state signal is generated, and an operating system on the in-line equipment is rebooted. The process unit receives a state signal generated by the monitoring unit. As the received signal changes from the second state signal to the first state signal, the first control instruction is sent to the optical switching module. As the received signal changes from the first state signal to the second state signal, the second control instruction is sent to the optical switching module.

The monitoring unit may be a watch dog timer (WDT) chip, while the process unit may be a complex programmable logic device (CPLD) or CPU.

Figure 4:
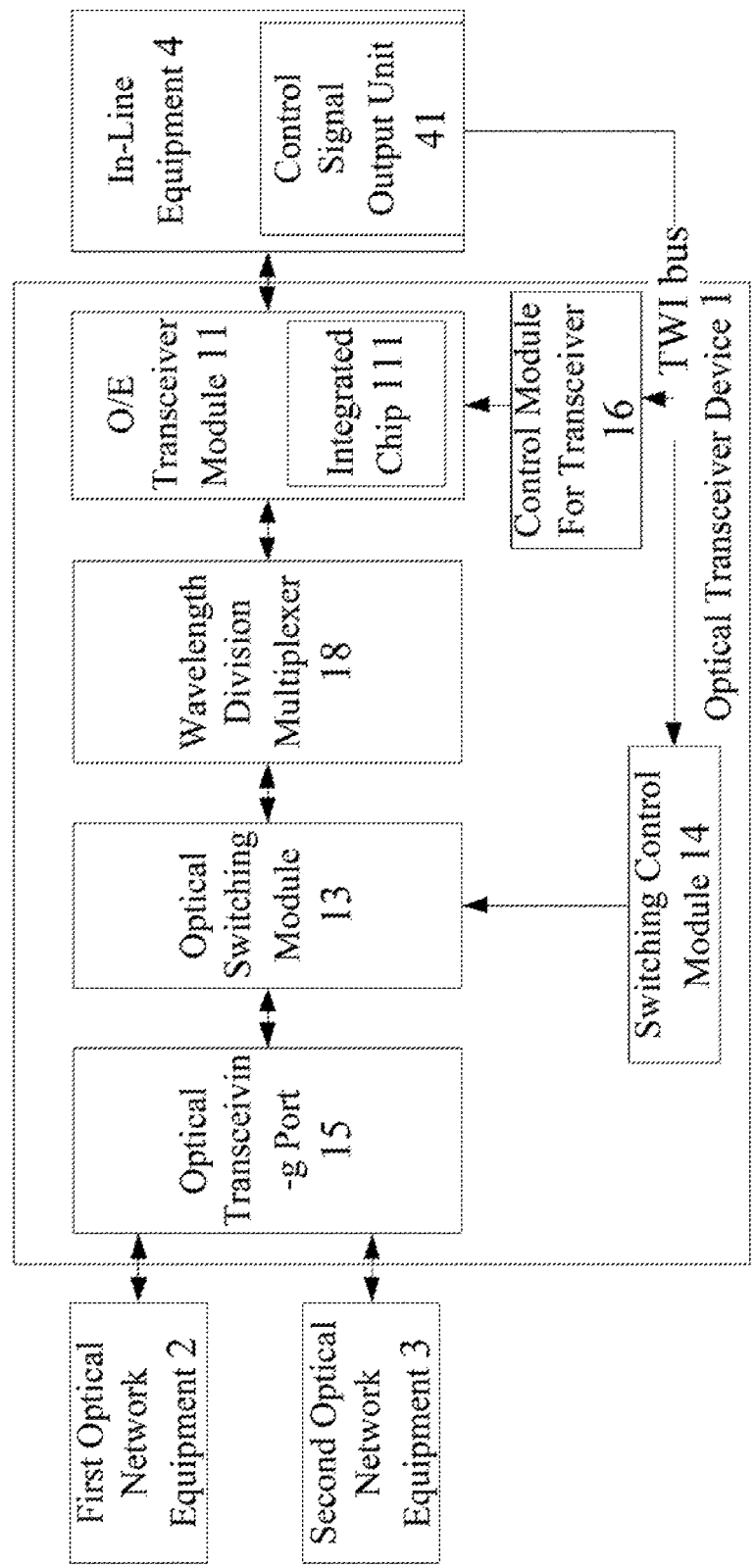
FIG. 4 is a structure diagram showing an optical transceiver device of a fourth example according the invention.

In addition, as shown the example of FIG. 4, a wavelength division multiplexer (WDM) 18 may further be provided between the O/E transceiver module 11 and the optical switching module 13 in the optical transceiver device 1 of the invention to multiplex the optical signal of various different wavelengths for transmission within the same optical fiber. As such, the number of optical fibers optically coupling the O/E transceiver module 11 and the optical switching module 13 may be reduced in order to economize optical switches arranged in the optical switching module 13, and further reduce the volume occupied by the optical transceiver device 1 of the invention. Moreover, the wavelength division multiplexer 18 may be arranged optionally in the OLE transceiver module 11 to achieve reduced volume as well.

Figure 5A:
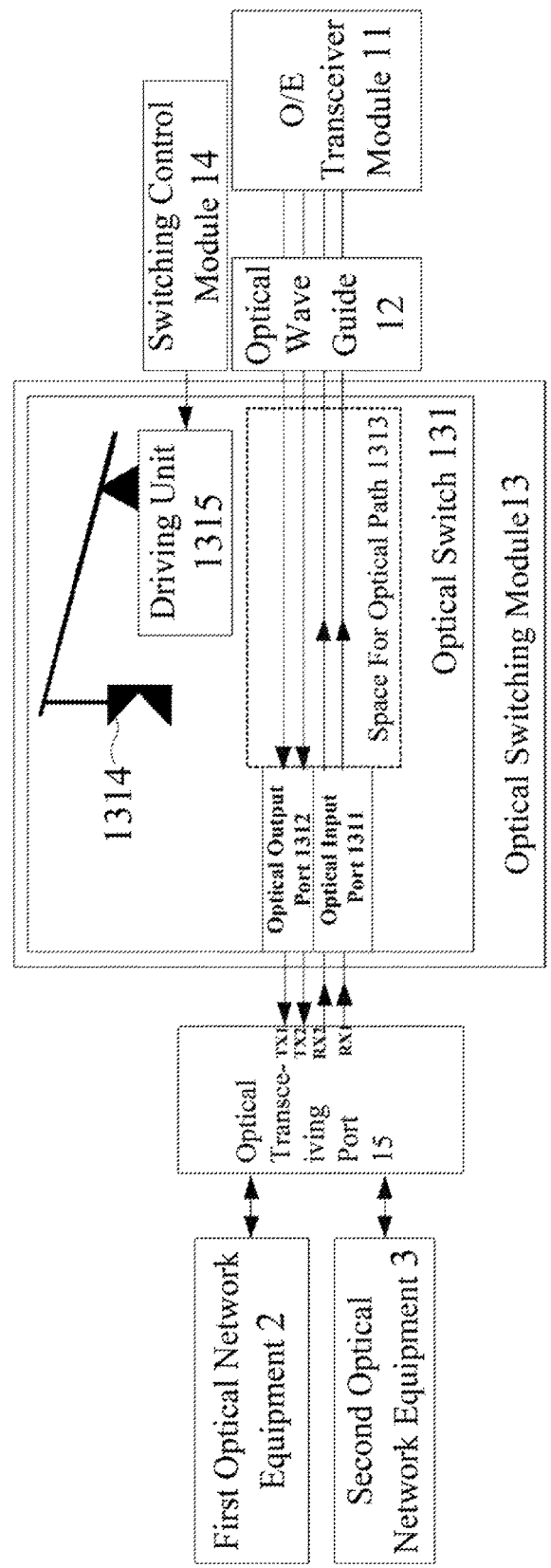

Refer to FIGS. 5A and 5C, which are schematic views showing different switching states of the optical switches in the optical switching module of the invention. As shown in the figures, an optical switch 131 in the optical switching module 13 of the invention further includes an optical input port 1311, an optical output port 1312, a space for optical path 1313, an optical element 1314 and a driving unit 1315. Wherein, the optical input port 1311 is used to input optical signal transmitted from optical transceiving port 15. The optical output port 1312 is used to output optical signal for the optical transceiving port 15 to receive. The optical input port 1311 and the optical output port 1312 are located at the same side of the optical switching module 13 close to the optical transceiving port 15 to reduce routing opportunity of optical fibers for the optical switching module 13 and the optical transceiving port 15, such that the space reserved for optical fiber routing necessary by the optical transceiver device 1 is reduced. The space for optical path 1313 is a space without obstacle to optical signal traveling used to provide an optical channel for optical signal to travel. The optical element 1314 is used for optical signal reflection to switch the optical channel for the optical signal to travel in the space for optical path 1313. The driving unit 1315 is connected with the optical element 1314 and electrically connected to the switching control module 14 for receiving the optical switching control signal output from the switching control module 14, thereby the optical element 1314 into or removed from the space for optical path 1313 is controlled.

Refer to FIG. 5A, as the driving unit 1315 controls the optical element 1314 to move away from the space for optical path 1313, the optical switch 131 of the optical switching module 13 runs in a normal mode, in which the input optical signal of the optical input port 1311 may pass through the space for optical path 133, the optical wave guide 12 sequentially to be transmitted to the O/E transceiver module 11; the optical signal provided by the O/E transceiver module 11 may pass through the optical wave guide 12, space for optical path 133 to be transmitted to the optical output port 1312.

Figure 5B:
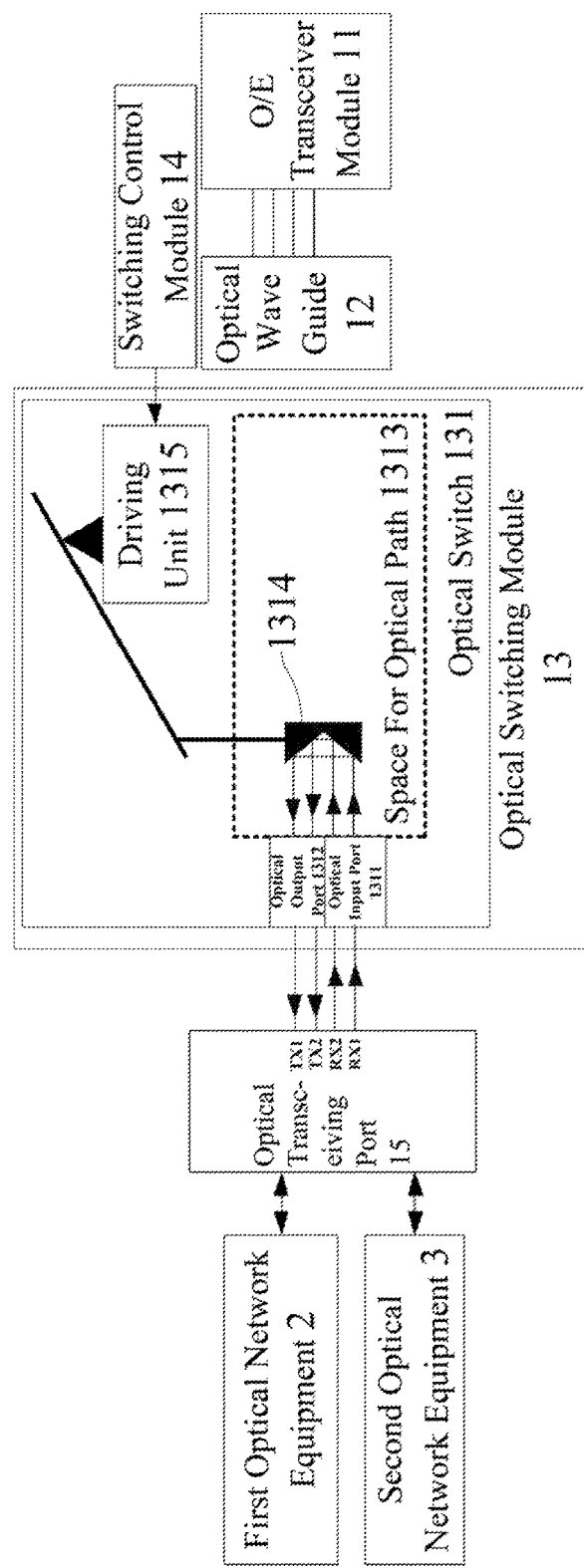

Refer to FIG. 5B continually, as the driving unit 1315 controls the optical element 1314 to move into the space for optical path 1313, the optical switching module 13 runs in the bypass mode, in which, after the optical signal input by the optical input port 1311 is reflected totally by the optical element 1314, the optical signal traveling channel will switch from the optical channel of the optical input port 1311 to the optical channel of the optical output port 1312, such that the optical signal may be outputted from the optical output port 1312 without the in-line equipment 4. That is, in the situation without the in-line equipment 4, the first optical network equipment 2 and the second optical network equipment 3 may transmit optical signal mutually through the optical switching module 13, so that uninterrupted optical signal transmitting between the first optical network equipment 2 and the second optical network equipment 3 is implemented.

In addition, as shown in FIG. 5C, an optical switching switch may be provided in each optical channel of the optical switching module 13. As the optical switching switch is in an off state, the optical switching module 13 runs in a bypass-disabled mode. Specifically, a manager may input the optical switching control signal through a control signal output unit 411 (refer to FIG. 1), and control the optical switching module 13 through the switching control module 14 to perform the corresponding optical switching operation, thereby the optical switching switch in each of the optical channels switches off the optical signal transmitting between the first optical network equipment 2 and the second optical network equipment 3. In other words, the above optical switching switch may control the on/off state of each optical channel in the optical switching module 13 to provide an effective response mechanism, for example, disabling the running of the optical switching module 13 in the bypass mode, for emergent events on network (such as network system intruded by virus or hacker etc.), thereby the security of network transmission is improved.

Figure 6B:
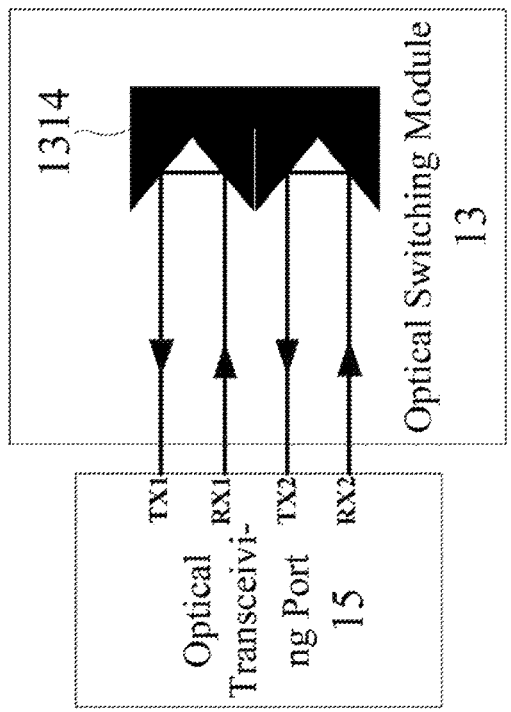
FIGS. 6A and 6B are perspective views of different examples for an optical element according to the invention.
Figure 6A:
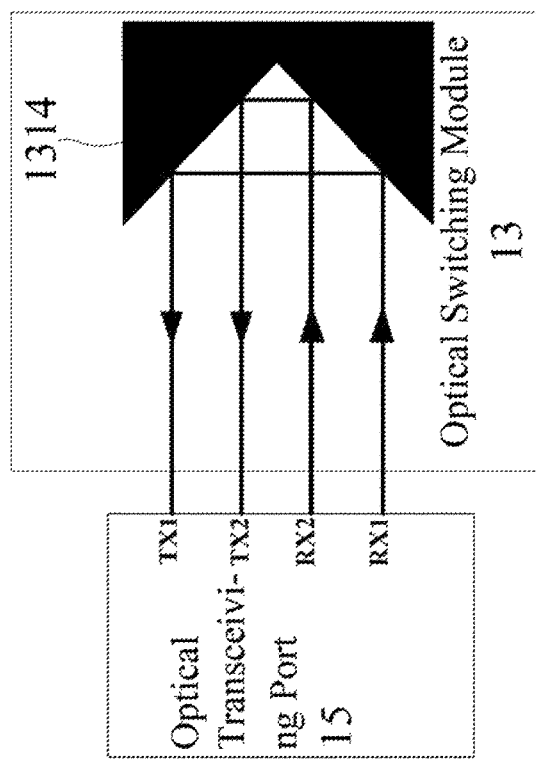

As shown in FIGS. 6A and 6B, the optical element 1314 of the invention is, for example, a total reflection mirror with a V-shaped or W-shaped reflection mirror plane on at least one side. The optical channel of the optical input port 1311 and the optical channel of the optical output port 1312 are parallel to each other. Preferably, the optical element 1314 may also have both V-shaped and W-shaped reflection mirror planes such that the V-shaped and W-shaped reflection mirror plane may be selected to accept the optical signal input from the optical input port 1311 depending on actual requirement for the optical switching states for the optical switching module 13 of the invention to be more versatile. It should be noted that, the optical element 1314 may still be formed of a prism or a mirror, but not limited thereto.

Figure 7:
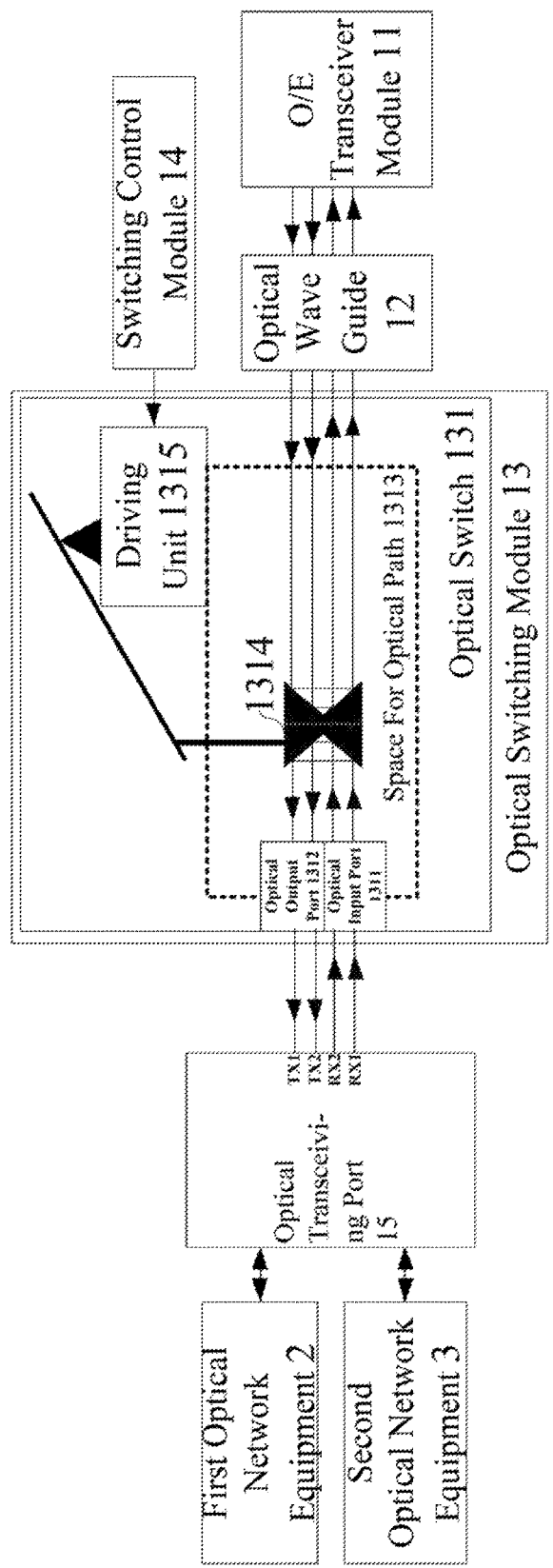
FIG. 7 is a state view showing an optical switching module forming a full path reflection optical switch according to the invention.

Also, refer to FIG. 7, two sides of the optical element 1314 facing the optical transceiving port 15 and the optical wave guide 12 may have a V-shaped or a W-shaped reflection mirror plane, respectively, for the optical switching module 13 to form a full OSW, such that the in-line equipment 4 may reflect optical signal through the reflection mirror plane of the optical element 1314 facing one side of the optical wave guide 12 to perform loop back detection for self-inspection of conditions as the optical switching module 13 runs in the bypass mode.

Figure 8:
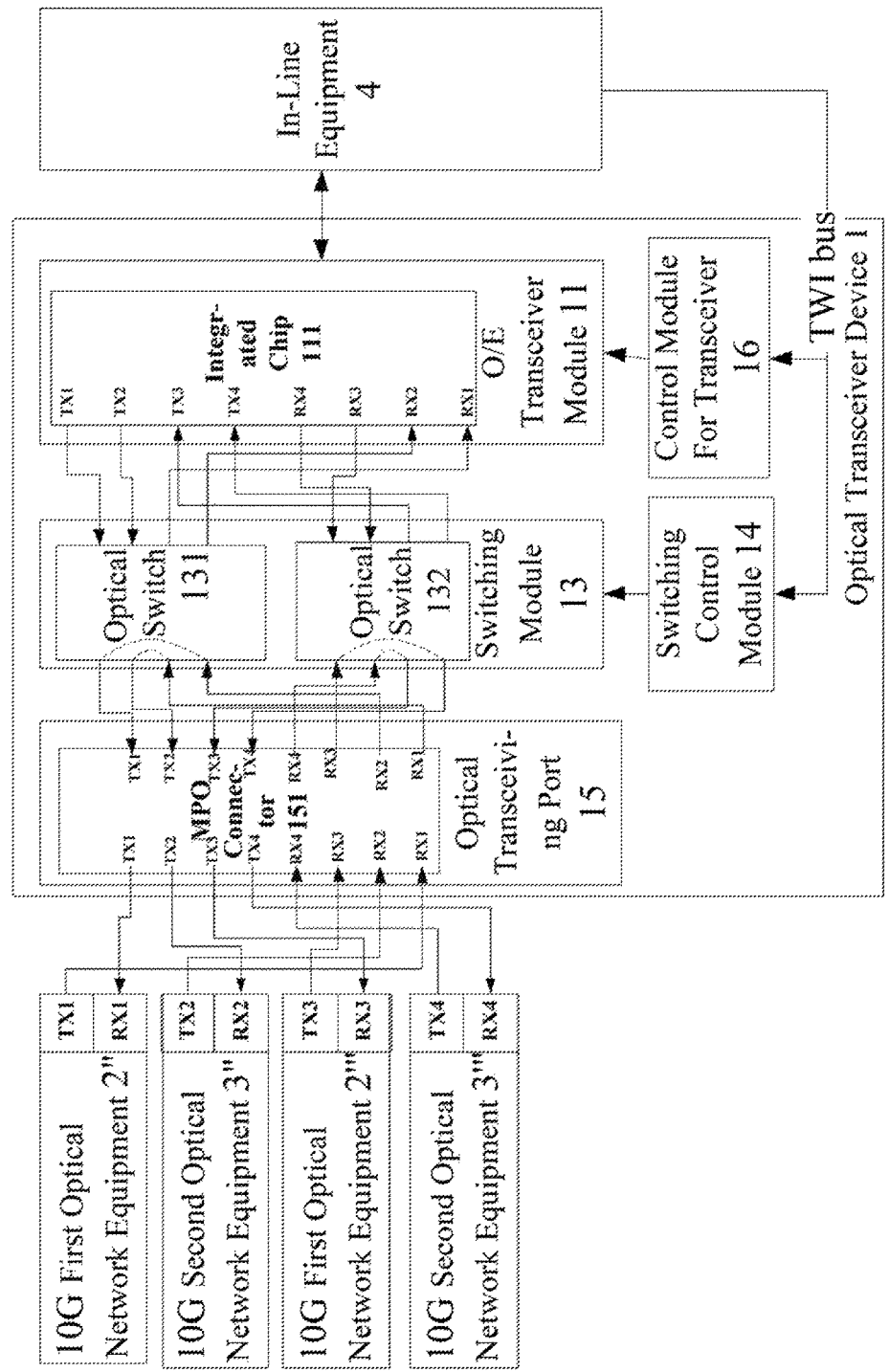
FIG. 8 is a block diagram showing the connection of a optical transceiver device and four 10 G optical network equipments according to the invention.
Figure 9:
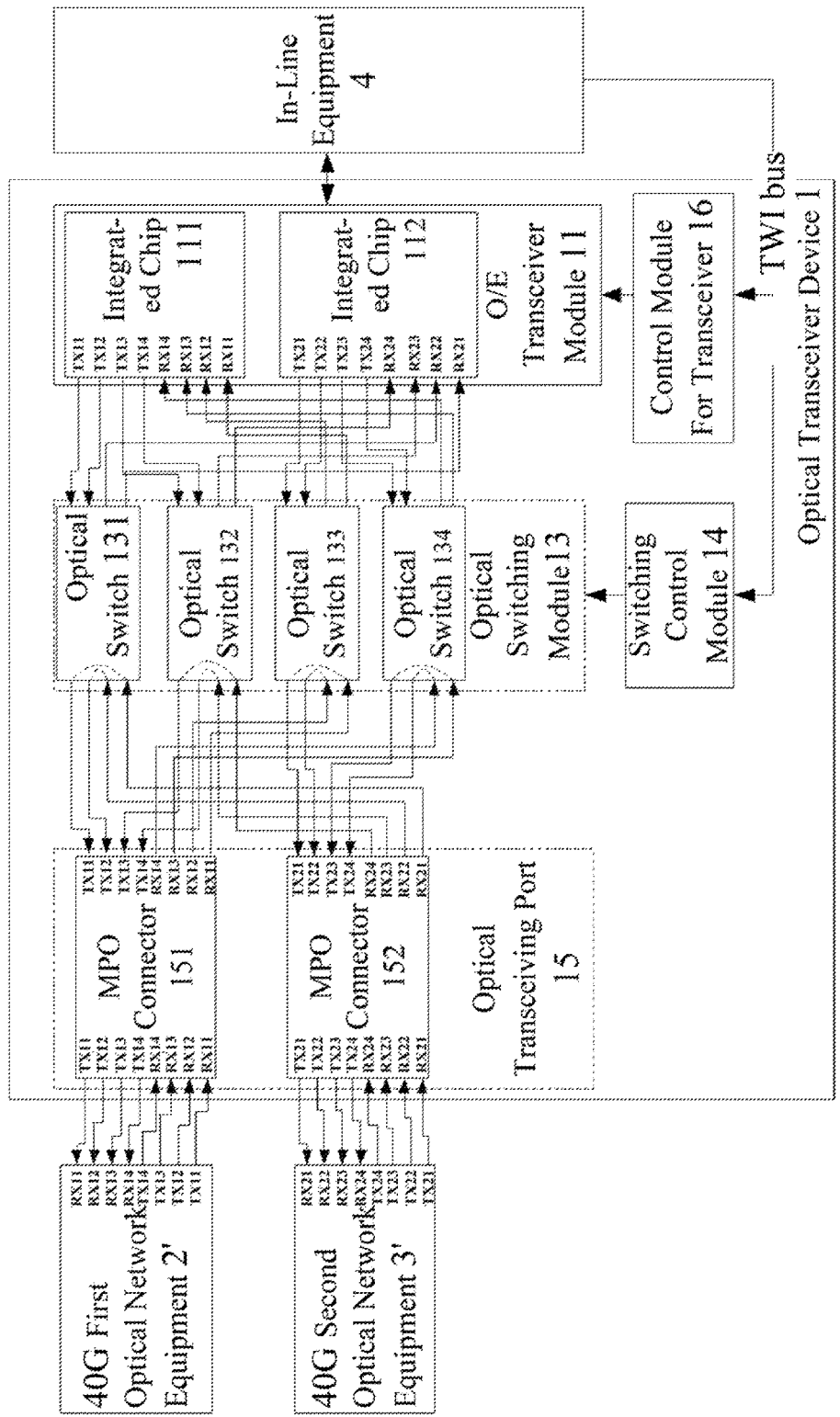
FIG. 9 is a block diagram showing the connection of an optical transceiver device and two 40 G optical network equipments according to the invention.
Figure 10:
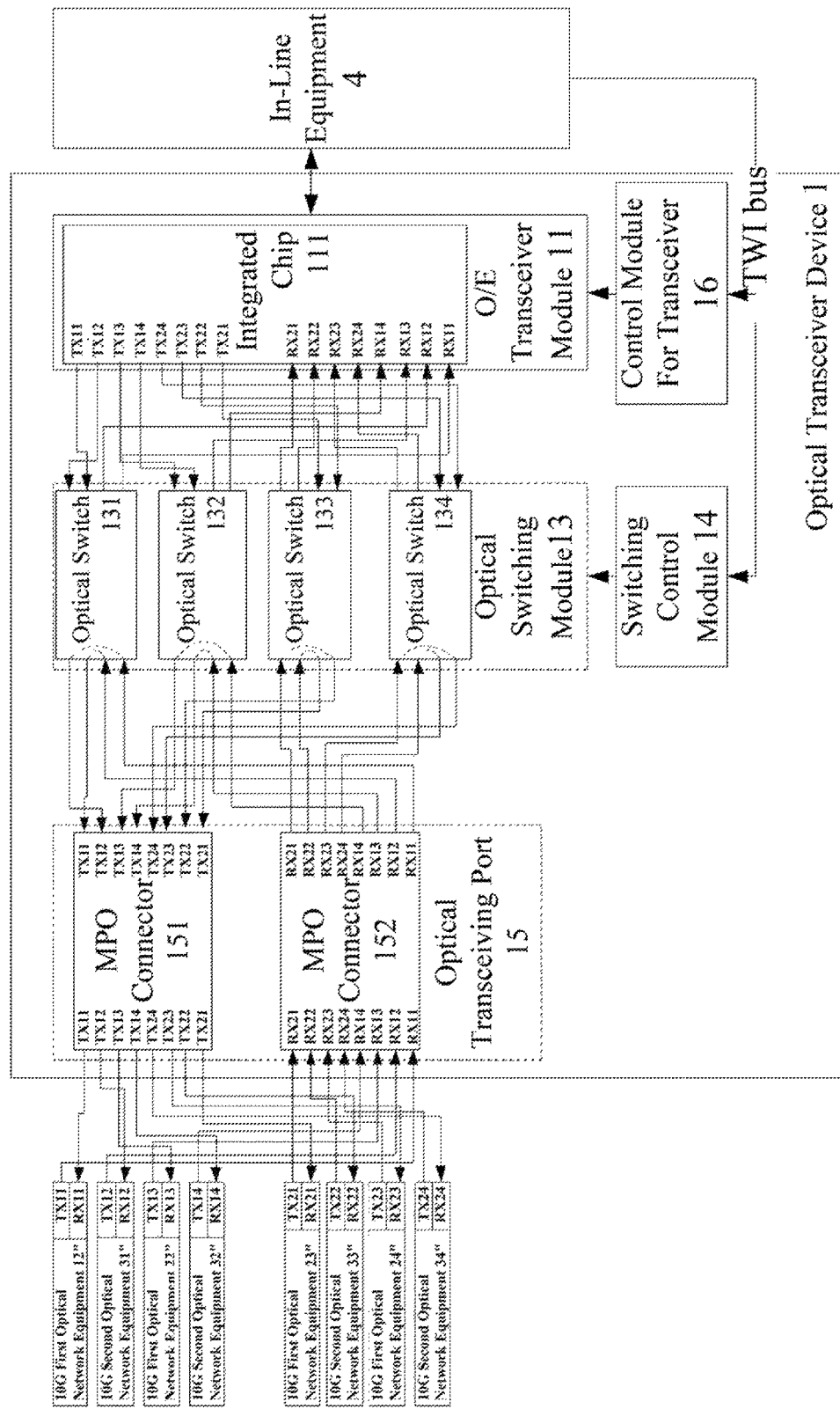
FIG. 10 is a block diagram showing the connection of an optical transceiver device and multiple 10 G optical network equipment according to the invention.

Refer to FIGS. 8, 9 and 10 together for the application for the optical transceiver device of the invention to connect with 10 G optical network equipments or 40 G optical network equipments. As shown in the example of FIG. 8, the optical transceiving port 15 provides a MPO connector 151, while the optical switching module 13 provides optical switches 131, 132. The MPO connector 151 provides ports for 10 G first optical network equipments 2", 2'" and 10G second optical network equipment 3", 3'" to plug, such that the above respective optical couplings of the 10 G first, second optical network equipments 2", 3", 2'", 3'" and the optical switches 131,132 are accomplished. The above optical switches 131, 132 may run on the bypass mode for the optical signal of the 10 G first optical network equipments 2", 2'" to be transmitted directly to the second optical network equipments 3", 3'" without the in-line equipment 4. Moreover, the optical switches 131, 132 may also run in the normal mode to transmit the optical signal of the 10 G first optical network equipments 2", 2'" to the integrated chip 111 of the OLE transceiver module 11 for OLE conversion, and transmit the converted electrical signal to the in-line equipment 4. Additionally, it should be noted that the OLE transceiver module 11 may also convert the electrical signal of the in-line equipment 4 into optical signal to be transmitted to above 10 G first, second optical network equipments 2", 3", 2'", 3'", respectively.

As shown in the implementation block diagram of FIG. 9, the optical transceiver device 1 is provided for the 40 G first optical network equipment 2' and the 40 G second optical network equipment 3' to plug for optical signal transmission of the two 40 G optical network equipments 2', 3'. With respect to this, the optical transceiving port 15 provides two MPO connectors 151, 152; while the optical switching module 13 provides optical switches 131, 132, 133, 134. The two MPO connectors 151, 152 provide plug ports for the 40 G first optical network equipment 2' and the 40 G second optical network equipment 3' to plug, so that the respective optical couplings of the above 40 G first, second optical network equipment 2', 3' and the optical switches 131, 132, 133, 134 are accomplished. The above optical switches 131, 132, 133, 134 may run in the bypass mode simultaneously for the optical signal of the 40 G first optical network equipment 2' to be transmitted to the second optical network equipment 3' directly without the in-line equipment 4. The optical switches 131, 132, 133, 134 may also run in the normal mode to transmit the optical signal of the 40 G first optical network equipment 2' to the integrated chips 111, 112 in the O/E transceiver module 11 for O/E conversion, and transmit the converted electrical signal to the in-line equipment 4.

Additionally, it should be noted that the O/E transceiver module 11 may also convert the electrical signal of the in-line equipment 4 into optical signal by the integrated chips 111, 112 for respective transmitting to the 40 G first optical network equipment 2' and the 40 G second optical network equipment 3'. Further refer to FIG. 10, the optical transceiver device 1 provided by the invention may be also plugged by multiple 10 G optical network equipments 21", 31", 22", 32", 23", 33", 24", 34" to form an optical fiber network and provide network communication services for these 10 G optical network equipment 21", 31", 22", 32", 23", 33", 24", 34". It should be noted that the optical switching modules 13 shown in FIG. 9, FIG. 10 are the same. Thereby, it is understood that optical switching modules with the same hardware specifications may be selected for various implementation perspectives of the optical transceiver device in the invention. As such, material cost of the optical switching module may be economized.

Figure 11:
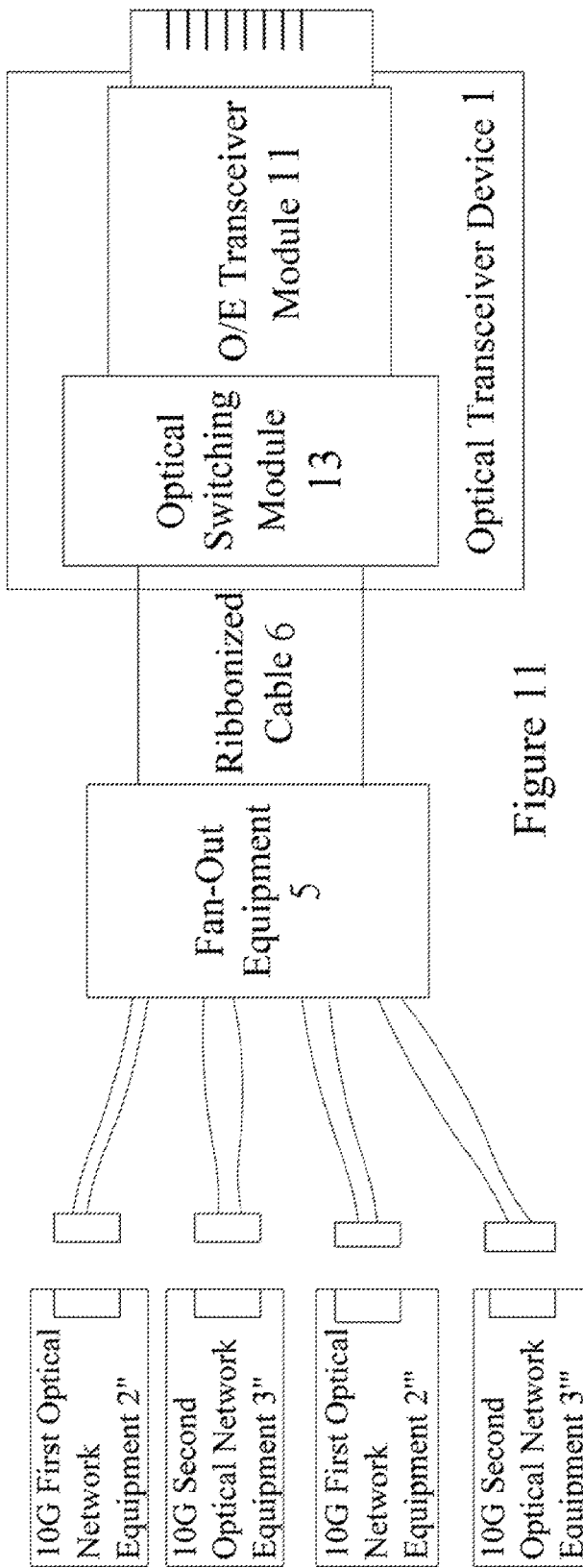
FIG. 11 is an implementation perspective view showing the connection of an optical transceiver device and multiple optical network equipments through a fan-out equipment according to the invention.
Figure 12:
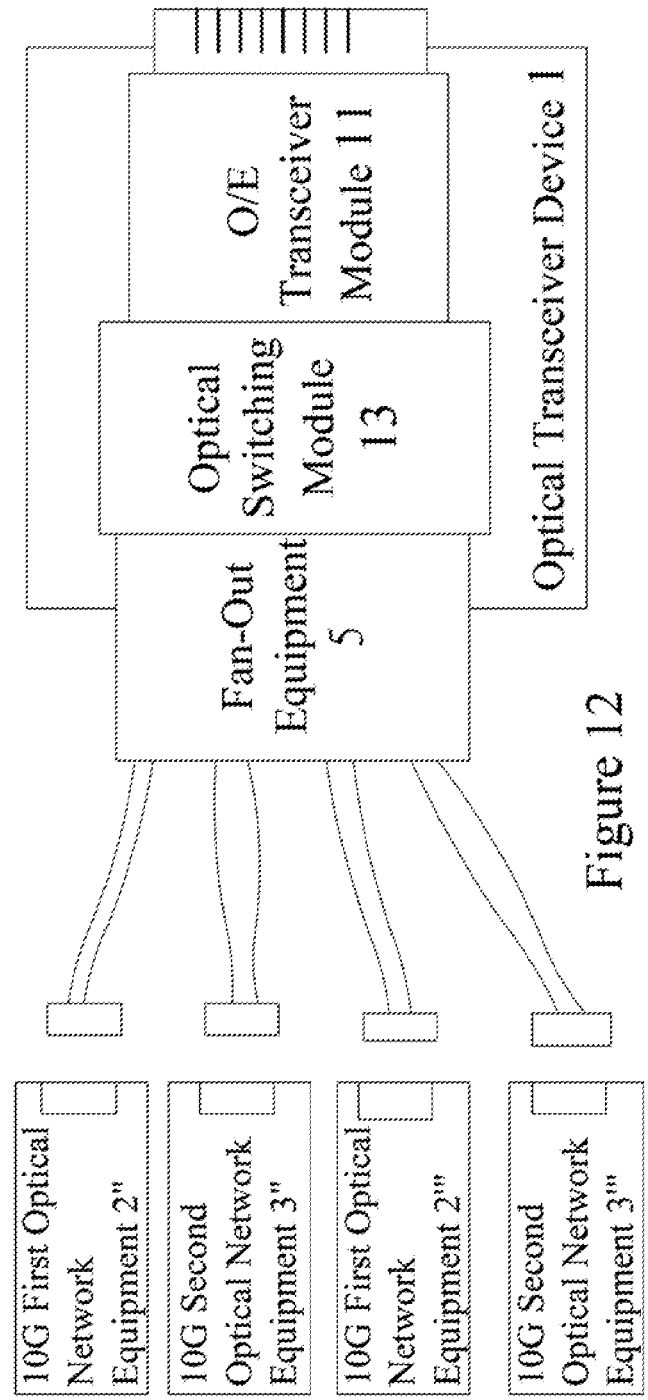
FIG. 12 is another implementation perspective view showing the connection of an optical transceiver device and multiple optical network equipments through a fan-out equipment according to the invention.

The connection of the optical transceiver device and the optical network equipment of the invention is also achievable in a non-MPO connector approach. Refer to FIGS. 11 and 12. As shown in the referenced figures, the optical transceiver device 1 may be connected to the fan-out equipment 5 externally through a ribbon fiber 6 extended from the optical switching module 13 (as shown in FIG. 11), or allow the optical switching module 13 to be connected to the fan-out equipment 5 externally (as shown in FIG. 12), such that the connection with multiple optical network equipment 2", 3", 2'", 3'" is accomplished. As such, the arrangement of the optical transceiving port for the optical transceiver device may be omitted to reduce the volume occupied by the optical transceiver device considerably. In addition, the O/E transceiver module 11 in FIGS. 11 and 12 may be a QSFP+ chip from selection, for the optical transceiver device to be plugged onto the in-line equipment in order to increase the convenience of usage.

In conclusion, the optical transceiver device of the invention has at least the following advantages and features:

1) Multiple O/E transceiver units are integrated on an integrated chip to minimize the O/E transceiver module, and further reduce the volume of the optical transceiver device.

2) The optical switching module may switch the optical channels with the mirror total reflection principle so that the optical switching module may have the optical access ports provided on one side of the optical transceiver module, such that the optical fibers of the optical access ports may be connected to the optical transceiving port under reduced routing, and thereby the objective of reduced entire volume of the optical transceiver device is achieved.

3) The optical elements provided by the optical switching module may be switched to be reflection mirrors with V-shaped or W-shaped reflection mirror planes for changing optical switching channels, thereby the optical switching operation is more flexible.

4) The connection with the optical network equipment may be accomplished through an external connected fan-out equipment without the arrangement of the optical transceiving port such that the entire volume of the optical transceiver device is reduced.

5) It may be manufactured as an active optical bypass cable (or referred to as Active Optical Cable with Bypass Function).

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. An optical transceiver device, which is used to connect a first, second optical network equipments and an in-line equipment, respectively, in order to form an optical fiber network to provide network communication services for said first, second optical network equipments, said device including:

an O/E transceiver module, which is formed by an integrated chip integrating a plurality of O/E transceiver units, said integrated chip being integrated with multiple full duplex transmitting parallel channels for receiving optical signal in parallel, and converting the received optical signal into electrical signal, and transmitting the converted electrical signal to said in-line equipment; or for receiving electrical signal of said in-line equipment, and converting the received electrical signal into optical signal;

a control module for transceiver, which electrically connects said in-line equipment and said O/E transceiver module, for receiving an O/E transceiving control signal output from said in-line equipment, thereby each of said O/E transceiver units on the integrated chip in said O/E transceiver module being controlled to perform a corresponding O/E transceiving operation;

an optical wave guide for changing the traveling direction of optical signal;

an optical switching module, which has optical switches for performing a switching operation of optical channels, being optical coupled with said first, second optical network equipments for receiving the optical signal of said first, second optical network equipments, and optically coupling said O/E transceiver module through said optical wave guide in order for optical signal transmitting with said O/E transceiver module; and a switching control module, which electrically connects said in-line equipment and said optical switching module, for receiving the optical switching control signal output from said in-line equipment, thereby said optical switching module being controlled to perform a corresponding optical channel switching operation, wherein the O/E transceiver module is connected between the optical wave guide and the in-line equipment, for receiving optical signal from the optical wave guide, converting the received optical signal into electrical signal, and transmitting the converted electrical signal to the in-line equipment; for receiving electrical signal of the in-line equipment, converting the received electrical signal into optical signal, and transmitting the converted optical signal to the optical wave guide.

2. The optical transceiver device according to claim 1, further including an optical coupler, which optically couples said first, second optical network equipments, an external monitoring equipment and said optical switching module, in order for said external monitoring equipment to monitor the optical signal transmitting between said first, second optical network equipments and in-line equipment.

3. The optical transceiver device according to claim 1, wherein, said in-line equipment connects said control module for transceiver and said switching control module through a TWI bus, respectively; further including a wavelength division multiplexer provided between said O/E transceiver module and the optical switching module.

4. The optical transceiver device according to claim 3, wherein, said in-line equipment further includes a control signal output unit, which connects said control module for transceiver and said switching control module through said TWI bus, respectively, for controlling both said control module for transceiver and said switching control module.

5. The optical transceiver device according to claim 1, wherein, said in-line equipment connects said switching control module through a GPIO port for controlling said switching control module.

6. The optical transceiver device according to claim 1, wherein, said optical switching module forms said optical wave guide by extending one end, or optically couples said optical wave guide by a MPO connector.

7. The optical transceiver device according to claim 1, wherein, the optical switches of said optical switching module includes:

an optical input port, which inputs optical signal sent from an optical transceiving port;

an optical output port, which outputs optical signal for an optical transceiving port to receive;

a space for optical path, which provides a plurality of optical channel for optical signal at said optical input port and said optical output port to travel;

an optical element for switching the optical channel with respect to which optical signal travels in said space for optical path; and a driving unit, which connects said optical element and electrically connects said switching control module, for receiving the optical switching control signal output from said switching control module, thereby the movement of said optical element to or from said space for optical path is controlled;

wherein, said optical input port and said optical output port are located at the same side of said optical switching module, and as said driving unit controls said optical element to move to said space for optical path, the optical signal input by said optical input port will be reflected by said optical element, the channel for the optical signal to travel will be switched from the optical channel of said optical input port to the optical channel of said optical output port.

8. The optical transceiver device according to claim 1, wherein, the optical element is a total reflection mirror with a V-shaped or W-shaped reflection mirror plane on at least one side; the optical channel of the optical input port and the optical channel of the optical output port are parallel to each other.

9. The optical transceiver device according to claim 1, wherein, said switching control module monitors the operation status of said in-line equipment by the optical switching control signal; as said in-line equipment is monitored as in normal operation, said switching control module send a first control instruction to the optical switching module for said first, second optical network equipment to perform optical signal transmitting to said O/E transceiver module; as said in-line equipment is monitored as in abnormal operation, the switching control module send a second control instruction to said optical switching module for the optical signal to be transmitted between the first, second optical network equipment mutually.

10. The optical transceiver device according to claim 1, wherein, said switching control module further including:

a monitoring unit, which receives a return-to-zero signal and performs timing operation; as the return-to-zero signal is received at the timing of a default time, a first state signal is generated; as the return-to-zero signal is not received at the timing of the default time, a second state signal is generated and an operating system on the in-line equipment is rebooted; and a process unit, which receives a state signal generated by the monitoring unit; as the received signal changes from the second state signal to the first state signal, a first control instruction is sent to said optical switching module; as the received signal changes from the first state signal to the second state signal, the second control instruction is sent to said optical switching module.

11. The optical transceiver device according to claim 10, wherein, said monitoring unit is a watch dog timer chip, and said process unit is a complex programmable logic device.

12. The optical transceiver device according to claim 10, wherein, said monitoring unit and said process unit are integrated as a chipset.

13. The optical transceiver device according to claim 1, further including a MPO/MTP connector, which be installed between said optical switching module and said optical wave guide.

14. An optical transceiver device, which is used to connect a first, second optical network equipments and an in-line equipment, respectively, in order to form an optical fiber network to provide network communication services for said first, second optical network equipments, said device including:

an O/E transceiver module, which is formed by an integrated chip integrating a plurality of O/E transceiver units, a wavelength division multiplexer, and multiple full duplex transmitting parallel channels for receiving optical signal in parallel, and the O/E transceiver module is for converting the received optical signal into electrical signal and transmitting the converted electrical signal to said in-line equipment, or for receiving electrical signal of said in-line equipment and converting the received electrical signal into optical signal;

a control module for transceiver, which electrically connects said in-line equipment, for receiving an O/E transceiving control signal output from said in-line equipment, thereby each of said O/E transceiver units on the integrated chip in said O/E transceiver module being controlled to perform a corresponding O/E transceiving operation;

an optical switching module, which has optical switches for performing a switching operation of optical channels, being optical coupled with said first, second optical network equipments for receiving the optical signal of said first, second optical network equipments, and optically coupling said O/E transceiver module through said wavelength division multiplexer in order for optical signal transmitting with said O/E transceiver module; and a switching control module, which electrically connects said in-line equipment and said optical switching module, for receiving the optical switching control signal output from said in-line equipment, thereby said optical switching module being controlled to perform a corresponding optical channel switching operation, wherein, said switching control module monitors the operation status of said in-line equipment by the optical switching control signal; as said in-line equipment is monitored as in normal operation, said switching control module send a first control instruction to the optical switching module for said first, second optical network equipment to perform optical signal transmitting to said O/E transceiver module; as said in-line equipment is monitored as in abnormal operation, the switching control module send a second control instruction to said optical switching module for the optical signal to be transmitted between the first, second optical network equipment mutually, and wherein, said switching control module further including:

a monitoring unit, which receives a return-to-zero signal and performs timing operation; as the return-to-zero signal is received at the timing of a default time, a first state signal is generated; as the return-to-zero signal is not received at the timing of the default time, a second state signal is generated and an operating system on the in-line equipment is rebooted; and a process unit, which receives a state signal generated by the monitoring unit; as the received signal changes from the second state signal to the first state signal, a first control instruction is sent to said optical switching module; as the received signal changes from the first state signal to the second state signal, the second control instruction is sent to said optical switching module.

15. The optical transceiver device according to claim 14, wherein, said monitoring unit is a watch dog timer chip, and said process unit is a complex programmable logic device.

16. An optical transceiver device, which is used to connect a first, second optical network equipments and an in-line equipment, respectively, in order to form an optical fiber network to provide network communication services for said first, second optical network equipments, said device including:

an O/E transceiver module, which is formed by an integrated chip integrating a plurality of O/E transceiver units, said integrated chip being integrated with multiple full duplex transmitting parallel channels for receiving optical signal in parallel, and converting the received optical signal into electrical signal, and transmitting the converted electrical signal to said in-line equipment; or for receiving electrical signal of said in-line equipment, and converting the received electrical signal into optical signal;

a control module for transceiver, which electrically connects said in-line equipment, for receiving an O/E transceiving control signal output from said in-line equipment, thereby each of said O/E transceiver units on the integrated chip in said O/E transceiver module being controlled to perform a corresponding O/E transceiving operation;

an optical wave guide for changing the traveling direction of optical signal;

an optical switching module, which has optical switches for performing a switching operation of optical channels, being optical coupled with said first, second optical network equipments for receiving the optical signal of said first, second optical network equipments, and optically coupling said O/E transceiver module through said optical wave guide in order for optical signal transmitting with said O/E transceiver module;

a switching control module, which electrically connects said in-line equipment and said optical switching module, for receiving the optical switching control signal output from said in-line equipment, thereby said optical switching module being controlled to perform a corresponding optical channel switching operation; and an optical coupler, which optically couples said first, second optical network equipments, an external monitoring equipment and said optical switching module, in order for said external monitoring equipment to monitor the optical signal transmitting between said first, second optical network equipments and in-line equipment.

* * * * *